United States Patent [19]

Weston

[11] Patent Number: 4,699,770

[45] Date of Patent: Oct. 13, 1987

[54] PRODUCTION OF A PURIFIED ALUMINA-SILICA PRODUCT AND SUBSTANTIALLY PURE ALUMINUM CHLORIDE FROM BAUXITES, BAUXITIC CLAYS, KAOLINITIC CLAYS AND MIXTURES THEREOF

[76] Inventor: David Weston, 34 Parkwood Avenue, Toronto M4V 2X1, Canada

[21] Appl. No.: 800,341

[22] Filed: Nov. 21, 1985

Related U.S. Application Data

[63] Continuation-in-part of Ser. No. 675,973, Nov. 28, 1984, abandoned.

[51] Int. Cl.$^4$ .............................. C01F 7/56; C01F 7/02
[52] U.S. Cl. .................................... 423/135; 423/136; 423/149; 423/495; 423/496; 423/327
[58] Field of Search ............... 423/135, 145, 495, 496, 423/327, 341, 342, 343, 347

[56] References Cited

U.S. PATENT DOCUMENTS

| | | | |
|---|---|---|---|
| 3,489,514 | 1/1970 | Slatin | 423/135 |
| 4,096,234 | 6/1978 | Martin et al. | 423/135 |
| 4,139,602 | 2/1979 | Wyndham et al. | 423/496 |
| 4,213,943 | 7/1980 | Martin | 423/135 |
| 4,277,446 | 7/1981 | Weston | 423/149 |
| 4,284,607 | 8/1981 | Cullectron et al. | 423/496 |
| 4,288,411 | 9/1981 | Holland et al. | 423/149 |
| 4,288,414 | 9/1981 | Reynolds et al. | 423/149 |
| 4,355,007 | 10/1982 | Dunn, Jr. | 423/149 |
| 4,363,789 | 12/1982 | Dunn, Jr. | 423/149 |
| 4,425,308 | 1/1984 | Weston | 423/135 |
| 4,425,309 | 1/1984 | Weston | 423/135 |
| 4,425,310 | 1/1984 | Weston | 423/135 |
| 4,425,311 | 1/1984 | Weston | 423/135 |
| 4,428,912 | 1/1984 | Reynolds et al. | 423/135 |

Primary Examiner—Gary P. Straub
Attorney, Agent, or Firm—Wenderoth, Lind & Ponack

[57] ABSTRACT

The invention is primarily directed to the production of a substantially iron free alumina-silica product and substantially iron free aluminum chloride from bauxites, bauxitic clays and kaolinitic clays wherein the feed material to an agglomeration stage is selected to contain a minimum of about 20% kaolinite mineral. The agglomerates are so formed to produce a product that is preferably at least minus 6 mesh plus 200 mesh and in a subsequent calcination stage the calcined agglomerates have a bulk density of preferably 0.8 to 1.3. In a subsequent differential iron chlorination stage a substantially iron free alumina-silica product is produced and in a subsequent mass chlorination stage substantially iron free aluminum chloride is produced.

6 Claims, 2 Drawing Figures

PREFERRED FLOWSHEET OF THE INVENTION
TO PRODUCE AN ALUMINA-SILICA PRODUCT SUBSTANTIALLY IRON FREE

MATERIALS — 10

SELECTED TO CONTAIN IN PREPARED PRODUCT AT LEAST 20% TO ABOUT 60% KAOLINITE AND AT LEAST 40% TO ABOUT 80% ALUMINA MINERALS WITH CHEMICAL ANALYSIS OF $Al_2O_3 \times H_2O$

MATERIALS PREPARATION CIRCUIT — 11

MAY CONSIST OF SUCH BENEFICIATION STEPS AS HIGH INTENSITY MAGNETIC SEPARATION – FLOTATION – AND GRAVITY CONCENTRATION. IN ALL CASES AGGLOMERATION OR PELLETIZING IS USED TO FORM A PREPARED PRODUCT CONSISTING OF AGGLOMERATES OR PELLETS OF THE MATERIAL OR MATERIALS IN THE SIZE RANGE OF MINUS 6 MESH TO ABOUT 200 MESH

PREPARED PRODUCT — 12

AT LEAST 20% TO ABOUT 60% KAOLINITE AND AT LEAST 40% TO ABOUT 80% $Al_2O_3 \times H_2O$ MINERALS. PARTICLE SIZE RANGE ESSENTIALLY MINUS 6 MESH TO ABOUT PLUS 200 MESH

→ OPTIONAL PREHEATING OF AGGLOMERATES OR PELLETS — 13

CALCINING STAGE — 14
TEMPERATURE 650°C TO ABOUT 900°C

CALCINED PRODUCT — 15

AT LEAST ONE DIFFERENTIAL IRON CHLORINATION STAGE — 16
CHLORINATION AGENT- AT LEAST ONE AGENT SELECTED FROM GROUP CONSISTING OF $Cl_2$, $COCl_2$, $CCl_4$, $HCl$, $AlCl_3$ AND $SiCl_4$. WITH $Cl_2$ ALONE PREFERRED CARRIER GAS IS CO OR MIXTURE OF CO AND $CO_2$ TO FORM CHLORINATION GAS STREAM. IN THIS CASE GAS STREAM IS REDUCING. WITH THE OTHER CHLORINATION AGENTS THE CARRIER GAS MAY BE NEUTRAL SUCH AS $CO_2$. PREFERRED CARRIER GAS IS MIXTURE OF CO AND $CO_2$. THE CHLORINATION AGENT FORMS MAXIMUM OF ABOUT 30% BY VOLUME OF CHLORINATION GAS STREAM AS CALCULATED AT 21.1°C AND ONE ATMOSPHERE PRESSURE.
TEMPERATURE ABOUT 550°C TO ABOUT 1100°C
PREFERRED TEMPERATURE ABOUT 680°C TO ABOUT 1000°C

ALUMINA-SILICA PRODUCT — 17
IMPOVERISHED IN IRON OR SUBSTANTIALLY IRON FREE

FIG. 1

PRODUCTION OF A PURIFIED ALUMINA-SILICA PRODUCT AND SUBSTANTIALLY PURE ALUMINUM CHLORIDE FROM BAUXITES, BAUXITIC CLAYS, KAOLINITIC CLAYS AND MIXTURES THEREOF

This application is a continuation-in-part of application Ser. No. 675,973, filed Nov. 28, 1984 (now abandoned).

BACKGROUND OF THE INVENTION

The invention is primarily applicable to materials such as bauxites, bauxitic clays, kaolinitic clays and mixtures thereof that have present as major impurities iron and titanium in various forms.

There has been a great deal of research and there is a vast quantity of literature in attempts to produce a relatively iron-free alumina, alumina-silica product and iron-free aluminum chloride from such raw materials. None of the processes proposed have been shown to be economically successful.

This problem can best be described by the following references: Landsberg *Chlorination Kinetics of Aluminum Bearing Minerals: Metallurgical Transactions B,* Volume 6B, June, 1985; pages 207–208. To quote from page 208, first column:

"Whereas Foley and Tittle showed that iron could be removed from pre-reduced bauxite by chlorination to produce a refractory grade alumina, FIG. 2 indicates that a substantial loss of alumina accompanies the initial rapid iron chlorination under reducing conditions. Even if this loss could be tolerated the remaining iron is too high for producing cell grade alumina or aluminum chloride."

U.S. Pat. No. 3,842,163, A. S. Russell et al., entitled "Production of Aluminum Chloride" and assignors to Aluminum Company of America, state, to quote lines 45 to 58:

"In general, the reduction of aluminum-containing materials with chlorine in the presence of reducing carbon in some form to produce aluminum chloride is an old and generally well-known reaction and one of the suggested expedients referred to above utilized Bauxite as the alumina containing material. Bauxite however, normally contains many impurities including iron oxide, silica, and titania. Since these impurities readily react with chlorine in the presence of carbon to form iron, silicon, and titanium chlorides, the usual gaseous aluminum chloride reaction effluent therefrom must be subjected to cumbersome and expensive after-purification measures if these chloride contaminants are to be separated to provide even a reasonably pure aluminum product."

The U.S. Department of the Interior, Information Circular i412 by Robert L. de Beauchamp, sums up the problem of producing $AlCl_3$ from various materials on page 6, the last paragraph reading as follows:

"The raw materials that may be used for the preparation of $AlCl_3$, include bauxite, clays, shale, anorthosite, coal ash, and many other aluminum containing materials. Bauxite or clays are the most logical choices because of their higher $Al_2O_3$ contents and the large reserves of these materials available. Iron is the impurity most deleterious to the process since it uses up chlorine and is difficult to remove from the product."

Canadian Pat. No. 569,830 to Groth in 1939 described a method for chlorinating aluminiferous materials by treating dehydrated and crushed raw materials with aluminum chloride vapor at 600° C.–900° C., removing hot reaction gases containing iron chloride and titanium chloride, treating the residue with chlorine and a reducing agent, and processing the recovered aluminum chloride vapor containing silicon chloride and carbon monoxide at temperatures above 800° C. with alumina or aluminous materials free from iron and titanium. The gases recovered from the chlorination process are oxidized to convert at least the chlorides of iron and titanium to their oxides prior to condensation. Therefore, because of the oxidation step, chlorides of the materials are not recovered in reusable form. Further, the vapor mixture recovered cannot be diluted with CO in order that the oxidation stage can be carried out.

Groth, Column 1, lines 28 to 32:

"It is true that when processing between 900° C.–1150° C. titanium is removed from the original material along with the iron in the form of titanium tetrachloride, but only in small amounts unless a large excess of aluminum chloride is used."

Weston, U.S. Pat. No. 4,277,446, in the first chlorination stage, depends upon the use of excess aluminum chloride containing $FeCl_3$ that is recovered from the circuit and returned to chlorinate the $Fe_2O_3$. To quote, Column 8, lines 30–34:

"(b) Excess $AlCl_3$ that is used is recovered at a low cost as an impure $AlCl_3$ containing $FeCl_3$ and returned to the Number One Chlorination stage without any deleterious effects on chlorinating the contained iron and titanium minerals."

Reynolds et al., U.S. Pat. No. 4,288,414, describe a process for the production of aluminum of substantially high purity from chlorination of clays associated with coal and bauxite. The improvements stated are forming the feed material into carbon-free briquettes, and introducing silicon chloride into the reductive chlorination step to further suppress the chlorination of siliceous materials contained in the feed. To differentially chlorinate the iron they describe using an oxidizing atmosphere wherein the iron is vaporized.

The first stage of column 2, lines 62 to 66 states:

"First, the clay or bauxite undergoes a pelletizing step wherein a hydrochloric acid binder solution is added and it is pelletized into high-density, high strength pellets in conventional equipment such as an extrusion type pelletizer."

Column 4, lines 1 to 4 states:

"Attempts to remove iron from the pellets by chlorinating under reducing or neutral conditions are not feasible because of cochlorination of excessive amounts of alumina."

In my claimed invention, using a reducing atmosphere, in excess of 90% of the contained iron in the calcined agglomerated product was chlorinated with less than 2% cochlorination of the contained alumina.

Further, contrary to the teachings of Reynolds et al., an important stage in my invention is to form agglomerates of the material in a specific size range and with comparatively low density, preferably in the bulk density range of 0.8 to about 1.2 following subsequent calcination. Thus, in the claimed process, contrary to the art, high pressure pelletizing or briquetting are avoided.

SUMMARY OF THE INVENTION

It is accordingly a primary object of the present invention to provide a novel and low cost process for the production of alumina-silica products substantially free of iron.

A further object of the present invention is to provide a novel and low cost process for the production of a substantially pure aluminum chloride and aluminum metal from bauxites, bauxitic clays, kaolinitic clays and mixtures thereof wherein the iron has previously been removed from the raw materials by differential chlorination prior to mass chlorination to produce aluminum chloride.

In satisfaction of the foregoing objects and advantages, there is presented by this invention in its broadest concept a process for the production of a substantially iron free alumina-silica product, and substantially pure aluminum chloride and subsequently aluminum metal from various materials containing aluminum in the form of aluminum oxide minerals and complex aluminum minerals such as Kaolinite, that is $Al_2O_3 2SiO_2 \cdot 2H_2O$, the preferred process comprising:

(a) Selecting the process feed material so that the prepared material as fed to the agglomeration stage contains about 20% to about 60% Kaolinite mineral and about 40% to about 80% $Al_2O_3 \times H_2O$ mineral on a dry basis.

(b) Forming agglomerates of the feed material to produce a sized agglomerated product that is essentially minus 6 mesh plus 200 mesh and after a subsequent calcination stage will have a bulk density of 0.8 to 1.3 and particle size of essentially minus 6 mesh plus 200 mesh.

(c) Calcining the agglomerated product in the temperature range of 650° C. to about 900° C. to produce calcined agglomerated product preferably in the bulk density range of 0.8 to 1.3 and particle size of essentially minus 6 mesh plus 200 mesh.

Although all of the three above noted functions in the process are seemingly unrelated in subsequently producing a substantially iron-free alumina-silica product, surprisingly I have found that all three are important in obtaining the desired product with minimum co-chlorination of the contained alumina in the agglomerate stage prepared material.

Their combined function, to produce in subsequent stages substantially iron-free alumina-silica product, and subsequently substantially iron-free aluminum chloride, and substantially iron-free aluminum metal are still not fully understood, and can only be partially theorized.

(d) Conducting at least one differential iron chlorination stage in which at least one differential iron chlorination agent selected from the group consisting of $Cl_2$, $COCl_2$, $CCl_4$, HCl, $SiCl_4$ and $AlCl_3$ is employed. When employing $Cl_2$ as the differential iron chlorination agent a reducing atmosphere must be employed as, for example CO or C. In the case of the other listed agents a neutral to reducing atmosphere can be used. I have found that by use of minor quantities of chlorination agent, that is, less than about 30% of the chlorination gas stream, selected from this group in combination with the preceding steps at least 99% of the contained iron in the raw material can be differentially chlorinated with less than 2% co-chlorination of the contained $Al_2O_3$.

The temperature in this Number One differential iron Chlorination Stage is 550° C. to about 1100° C., and preferably about 680° C. to about 1000° C..

(e) Conducting a mass chlorination stage in which the contained $Al_2O_3$ is chlorinated to produce aluminum chloride by subjecting the solids product produced in (d) to a chlorination stage wherein at least one chlorination agent is selected from the group consisting of $Cl_2$, $COCl_2$ and $CCl_4$ and where when selecting $Cl_2$ as at least one of the selected chlorination agents, a reducing agent from the group consisting of C and CO is also present.

(f) Subjecting the gas stream produced by (e) to at least differential temperature condensation to produce a substantially iron-free aluminum chloride.

(g) Passing the aluminum chloride produced in (f) to a fused salt electrolytic cell to produce substantially iron-free aluminum metal and cycling the free chlorine to preferably (e).

If the contained iron in the calcined agglomerated product is not removed prior to the mass chlorination stage a substantial portion of it wil chlorinate under the mass chlorination stage conditions and finally report in the aluminum metal produced which is unacceptable in the production of a relatively pure aluminum metal.

All of the steps described beginning with the calcination stage may be carried out in fluo-solids reactors, well-known in the art.

The following will define for clarity various terms used in describing the invention:

Calcination—also known as dehydration—this terminology as used in this application means the following:
  (a) Removal of any free moisture as steam.
  (b) Breaking down of the bond of water of crystallization in aluminum oxide minerals wherein a high percentage of water of crystallization is driven off as steam.
  (c) Breaking down of the chemical bond or bonds of complex aluminum minerals such as Kaolinite, $Al_2O_3 \cdot 2SiO_2 \cdot 2H_2O$, wherein the $H_2O$ is driven off as steam and $Al_2O_3$ and $SiO_2$ are converted into amorphous $Al_2O_3$ and amorphous $SiO_2$ respectively. To accomplish satisfactory calcination of bauxites and clays, a temperature range of 650° C. to about 900° C. may be used. It will be appreciated that the effectiveness of the calcination step is a primary function of temperature and time, the economic optimum being readily determined by anyone skilled in the art.

This stage of the process uses conventional equipment well known in the art, and consists of such equipment as horizontal rotary kilns, vertical shaft furnaces, and fluo-solids reactors with their auxiliary gas scrubbers and dust collection units.

Aluminum chloride—by this term is meant $AlCl_3$ or $Al_2Cl_6$.

Kaolinitic Clays—generally refer to materials containing little or no $Al_2O_3 \times H_2O$ minerals and the major aluminum mineral component is essentially kaolinite.

Kaolinitic Silica—silica chemically bound in Kaolinite.

Bauxitic Clays—mixture of kaolinite and $Al_2O_3 \times H_2O$ minerals.

Bauxites—predominately $Al_2O_3 \times H_2O$ minerals with minor amounts of Kaolinite. .

In all of the materials in which the invention is claimed to be applicable, that is bauxites, bauxitic clays, kaolinitic clays and mixtures thereof it will be noted that the product produced in the calcination stage will have both alumina ($Al_2O_3$) and amorphous silica ($SiO_2$) present, the amorphous silica being produced by the breaking down of the kaolinite in this calcination stage.

Iron and Titanium—the standard practice of the aluminum industry is to report Fe and Ti analyses as $Fe_2O_3$ and $TiO_2$. The iron and titanium minerals contained in the aluminum bearing materials vary considerably and are but rarely only in the form of $Fe_2O_3$ and $TiO_2$. For instance the major iron mineral in Arkansas bauxite is siderite, $FeCo_3$, and the most common occurring form of titanium is as ilmenite, $FeOTiO_2$. When I refer to percentages of $Fe_2O_3$ and $TiO_2$ herein, I mean the chemical analyses of Fe and Ti converted to $Fe_2O_3$ and $TiO_2$ respectively.

Carbon—any form of carbon that can be used in specific stages of the process of the invention as a reducing agent for the contained metallic oxides in the raw material used in the process herein described, and that will not introduce added impurities that may have a major detrimental effect on the final desired product.

Examples of such carbon are charcoal, devolatilized coal coke, devolatilized petroleum coke and bitumen. The type of coke used should be carefully selected to avoid introducing comparatively large quantities of impurities that may have a major detrimental effect in the process to produce pure aluminum chloride.

Devolatilization—refers to solid fuels such as coal or petroleum coke wherein the specific material has been heated to a sufficiently high temperature to drive off substantially all of the contained water as water vapor and any free hydrogen contained in the raw material.

Free moisture—means water that is contained in the material, is not chemically combined and can be vaporized at a temperature of about 100° C.

Dry weight—free moisture only removed.

Mesh size—when I refer to a minus mesh size of a product this means that substantially all of the product will pass through the specified screen size U.S. standard. For instance, minus 8 mesh product means that substantially all of the product will be finer than 8 mesh. When I refer to a plus mesh size at least 90% of the product will remain on the specified screen size. For instance, plus 200 mesh product means that at least 90% of the product will be coarser than the 200 mesh screen openings.

Agglomerates—refers to a large number of fine particles held together in a controlled maximum particle size. Pellets are the same with the exception that they are normally formed on a drum well known in the art. Agglomerated particles formed by such methods as drying, crushing and screening a filter cake of the material or material as mined, after screening may be passed onto a pelletizing drum to form a semi-round pellet. For purposes of describing this invention, agglomerates or pellets have the same meaning as does agglomerated product or pelletized product.

Tap or bulk density—is a conventional means of measuring the density of a product such as a calcined agglomerated product by placing a specific weight of the material in a walled vessel, tapping the sides of the vessel, usually for a specific period of time, allowing the material to form into its natural lowest volume, and calculating density of the settled material.

BRIEF DESCRIPTION OF THE DRAWINGS

Reference is now made to the drawings accompanying the application where it will be seen that FIG. 1 shows a preferred flowsheet of the invention for the production of an alumina-silica product substantially free of iron.

DETAILED DESCRIPTION OF THE DRAWINGS

Figure 2:
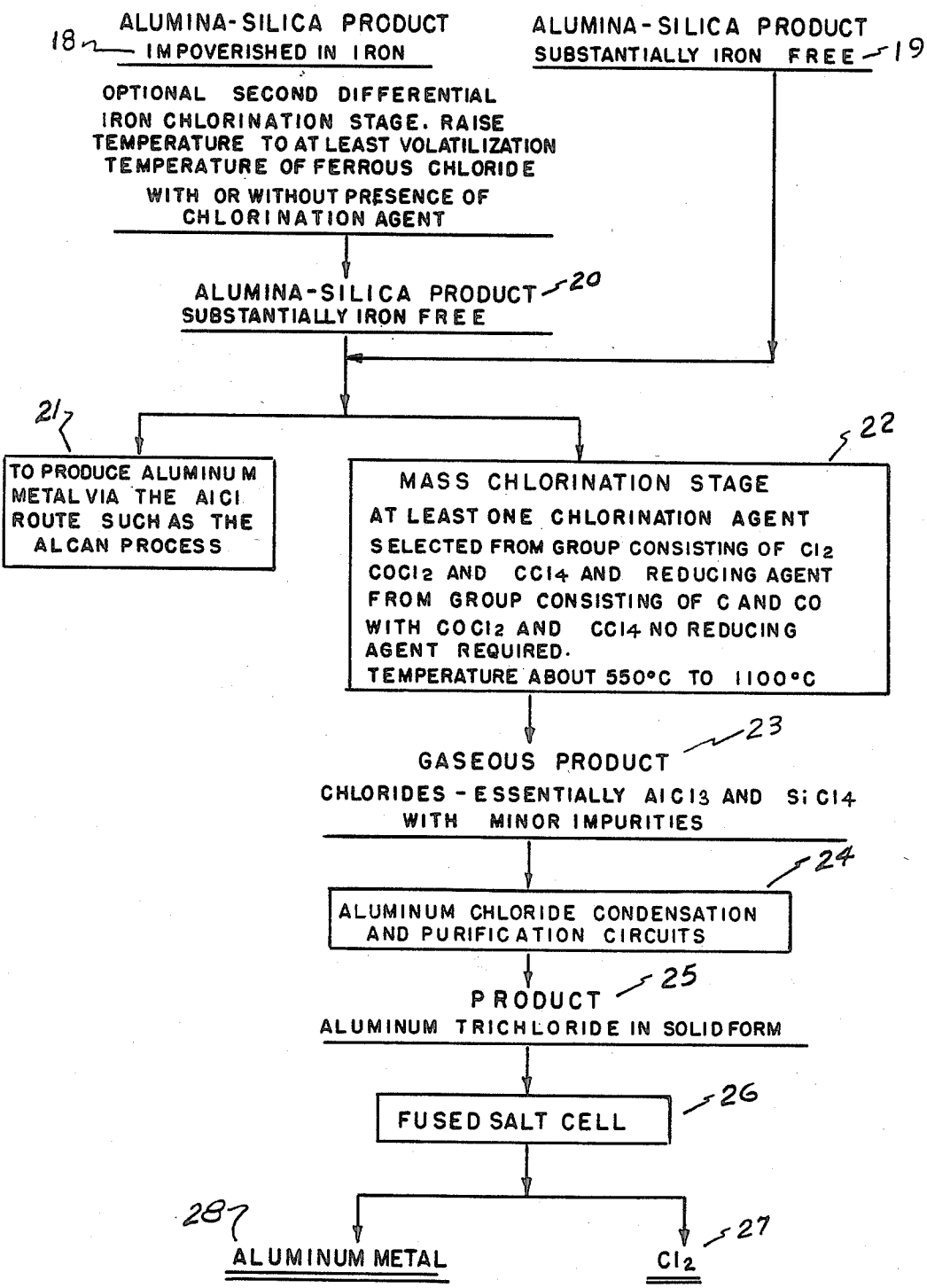
FIG. 2 shows a preferred flowsheet of the invention treating the substantially iron free alumina-silica product produced by the FIG. 1 flowsheet to produce a substantially iron free aluminum chloride and subsequently substantially iron free aluminum metal.

FIG. 1. My preferred feed material is shown at 10. The materials preparation circuit is shown at 11 wherein most importantly agglomerates are formed in the size range of about minus 6 mesh to plus 200 mesh and so that in the subsequent calcining stage the calcined product shown at 15 will have a bulk density in the range of about 0.80 to 1.3. Contrary to the art, minimum pressure must be used to achieve this bulk density. The prepared product 12 may be optionally preheated as shown at 13 to either reduce the moisture content of the agglomerates or to strengthen the agglomerates prior to the calcining stage shown at 14. The calcined product 15 will be essentially minus 6 mesh plus 200 mesh, have a bulk density of about 0.80 to 1.3 and contain a minimum of about 10% amorphous silica from the breakdown of Kaolinite during calcining. The calcined product is the feed to the at least one differential iron chlorination stage shown at 16 to produce an alumina-silica product substantially iron-free or impoverished in iron as shown at 17.

FIG. 2. Where the alumina-silica product shown at 17, FIG. 1, is impoverished in iron to produce an alumina-silica product substantially iron free the product shown at 18 is heated to above 680° C. or the volatilization temperature of ferrous chloride depending upon operating conditions and agents used with or without presence of chlorination agent. Shown at 19 is the aluminasilica product substantially iron free. The alumina-silica product shown at 20 will either be fed to an aluminum monochloride process shown at 21 to produce aluminum metal or alternately as shown at 22 a mass chlorination stage to produce aluminum trichloride and minor quantities of $SiCl_4$ shown at 23. Shown at 24 is the aluminum chloride product circuit wherein I prefer to use at least one condensation step above about 190° C. to condense minor impurities prior to the condensation of the aluminum chloride. The condensed aluminum chloride, below a temperature of about 180° C. is fed to a fused salt cell shown at 26 to produce aluminum metal substantially iron free as shown at 28 and $Cl_2$ shown at 27 which is preferably circulated to the mass chlorination stage shown at 22.

EXAMPLES OF THE INVENTION

In this program, five different batches of agglomerates were produced combining a Kaolinitic Clay material from the south eastern United States and containing predominantly Kaolinite mineral with a Bauxite from South America containing predominantly $Al_2O_3 \cdot X$-$H_2O$ minerals. All agglomerates produced were in the bulk or tap density range of 0.8 to 1.2.

The chemical analysis of the beneficiated Kaolinitic Clay was as follows:

| % by weight | | | | |
| --- | --- | --- | --- | --- |
| Al$_2$O$_3$ (Calc.) | SiO$_2$ | Fe$_2$O$_2$ | TiO$_2$ | L.O.I. (Calc.) |
| 39.5 | 44.4 | 1.14 | 1.49 | 13.5 |

The chemical anlaysis of the beneficiated Bauxite was as follows:

| % by weight | | | | |
| --- | --- | --- | --- | --- |
| Al$_2$O$_3$ (Calc.) | SiO$_2$ | Fe$_2$O$_3$ | TiO$_2$ | L.O.I. (Calc.) |
| 63.2 | 1.76 | 2.02 | 0.43 | 32.6 |

Five lots of agglomerated product were produced from the two above noted raw materials. Following blending the combined final product of each lot was filtered to form a filter cake. The filter cake in each case was either air dried or dried on a steam plate at about 110° C. to less than 20% free moisture. The filter cakes were crushed in a jaw crusher followed by a 12 mesh U.S. Standard sieve with the oversize through a rolls followed by a 12 mesh screen. The undersize from the two screens were further screened on a 100 mesh screen with the minus 12 mesh plus 100 mesh forming the agglomerated product.

Lots 22, 23, 24 and 25 were composed of beneficiated Kaolinitic Clay and beneficiated Bauxite. Lot 26 was composed of unbeneficiated Kaolinitic Clay and beneficiated Bauxite.

The following table shows the approximate blended product in each lot and the calculated percentage of kaolinitic silica present in each lot.

| Lot Number | Parts Kaolinitic Clay | Parts Bauxite | Calcined % Kaolinitic Silica |
| --- | --- | --- | --- |
| 22 & 23 | 2 | 3 | 19.2 |
| 24 & 25 | 2 | 4 | 17.3 |
| 26 | 2 | 6 | 10.1 |

Lots 22, 23, 25 and 26 were all tested under the harshest operating conditions where the agglomerated products were fed at room temperature directly to a calcining stage in a fluo-solids reactor at temperatures between 700° C. and 910° C., and showing a maximum breakdown of about 10% by dry weight. This was an amazing result under such harsh operating conditions, without the use of a specific binder or stage pre-heating of the agglomerates at appreciably lower temperatures.

The effect of the Kaolinitic silica in combination with the agglomerate product particle size of minus 12 plus 100 mesh and the low density calcined pellets of 0.8 to 1.2 shows up outstandingly wherein with the calculated 19.2% Kaolinitic silica present in Lot 22 only about 2% of the agglomerates broke up on calcination.

EXAMPLE 1

Lot 22—minus 12 plus 100 mesh.

Feed charge to 53 mm. fluo-solids reactor was 260 gms.

Initial temperature reactor 800° C.

Final temperature reactor after 15 minutes calcining stage 820° C.; CO$_2$ was used as the fluidizing medium.

Differential iron chlorination stage was 20 minutes at 900° C. The iron chlorination agent was Cl$_2$ fed at the rate of approximately 0.8 gms/min. with the major part of the chlorination gas stream being CO.

4.0 gms. of CaCl$_2$ was added to the feed charge.

The mass chlorination stage to convert the Al$_2$/O$_3$ in the feed material to AlCl$_3$ was carried out as follows:

20 mins. 1010° C.—10.5 gms/min. Cl$_2$ and equimolar CO.

40 mins. 101° C.—7.2 gms/min. Cl$_2$ and equimolar CO.

The calculated corrected percent weight of the feed material chlorinated was 65.4.

The chemical analysis of the calcined head sample was as follows:

| % by weight | | | |
| --- | --- | --- | --- |
| Al$_2$O$_3$ (Calc.) | SiO$_2$ | Fe$_2$O$_3$ | TiO$_2$ |
| 69.3 | 26.75 | 2.69 | 1.21 |

The chemical analysis of the test residue was as follows:

| % by weight | | |
| --- | --- | --- |
| Al$_2$O$_3$ (Calc.) | SiO$_2$ | Fe$_2$O$_3$ (not analyzed) |
| 40.0 | 59.85 | — |

% by weight of residue was 34.6.

The Fe$_2$O$_3$ analysis following the differential iron chlorination stage was 0.023%, with an excess of 99% of the contained iron in the feed material differentially chlorinated.

The calculated percent of the total Al$_2$O$_3$ in the feed material chlorinated was 80%. This was an outstanding result indicating to not only have a high percentage of conversion to AlCl$_3$ of the Al$_2$O$_3$·XH$_2$O minerals but also an appreciable percentage conversion of the Kaolinitic Al$_2$O$_3$ to AlCl$_3$.

EXAMPLE 2—LOT 25

Feed size - minus 12 plus 100 mesh.

Charge to Fluo-solids reactor 260 gms.

Calcining Stage: 8 mins. 820° C. followed by 7 mins. 910° C. including time to go from 810° C. to 910° C. CO$_2$ used as fluidizing medium.

Chlorination Stage: Differential Iron

910° C. for 20 mins.

4.0 gms. KCl to bed.

0.80 gms. Cl$_2$/min.; CO formed major part of gas stream.

Stage: Mass Chlorination

910° C. for 60 mins.

11.4 gms. Cl$_2$/min.; CO equimolar.

The chemical analysis of the calcined head sample was as follows:

| % by weight | | | |
| --- | --- | --- | --- |
| Al$_2$O$_3$ (Calc.) | SiO$_2$ | Fe$_2$O$_3$ | TiO$_2$ |
| 72.6 | 23.64 | 2.68 | 1.06 |

The chemical analysis of the test residue was as follows:

|               | % by weight |       |
|---------------|-------------|-------|
| Al$_2$O$_3$ (Calc.) | SiO$_2$ | Fe$_2$O$_3$ |
| 58.9          | 41.0        | —     |

% weight of residue was 40.8.

The Fe$_2$O$_3$ analysis following differential iron chlorination stage was 0.042% resulting in an excess of 98% of the contained iron in the feed material differentially chlorinated to produce a substantially iron free alumina silica product prior to the mass chlorination stage.

EXAMPLE 3—LOT 26

Feed size—minus 12 plus 65 mesh.
Charge to fluo-solids reactor was 300 gms.
Calcining Stage: 8 mins. 750° C. followed by 12 mins. 910° C. including time to go from 750° C. to 910° C. CO$_2$ was used as fluidizing medium.
Chlorination Stage: Differential Iron
910° C. for 20 mins.
0.9 gms. Cl$_2$/min.; CO formed major part of the gas stream.
Stage: Mass Chlorination
910° C.
3 25 mins. 10.8 gms/min. Cl$_2$—CO equimolar.
35 mins. 7.1 gms/min. Cl$_2$—CO equimolar.
The chemical analysis of the calcined head sample was as follows:

|               | % by weight |       |       |
|---------------|-------------|-------|-------|
| Al$_2$O$_3$ (Calc.) | SiO$_2$ | Fe$_2$O$_3$ | TiO$_2$ |
| 81.9          | 14.41       | 2.76  | 0.94  |

The chemical analysis of the test residue was:

|               | % by weight |       |
|---------------|-------------|-------|
| Al$_2$O$_3$ (Calc.) | SiO$_2$ | Fe$_2$O$_3$ |
| 64.5          | 35.36       | —     |

% by weight of residue was 17.1%.

The Fe$_2$O$_3$ analysis following the differential iron chlorination stage was 0.19%.
Of the total Al$_2$O$_3$ in the feed material, the calculated Al$_2$O$_3$ chlorinated was 86.5%.

EXAMPLE 4

The following series of tests demonstrate the low temperature range of the differential iron chlorination stage in conjunction with agglomerates formed to produce a bulk density after calcination of about 0.8 to about 1.3 and a particle size range of essentially minus 6 mesh plus 200 mesh.

In Examples 4 and 5, the material used was predominately Kaolinite mineral. Prior to forming the agglomerates high intensity magnetic separation was used to remove substantial amounts of iron mineral.

The calcined product in this example analyzed 2.03% Fe$_2$O$_3$ and the bulk density of the calcined agglomerates was approximately 0.9.

The temperature of the differential iron chlorination stage was 788° C. and the time period was 40 minutes.

The differential iron chlorination agents used were SiCl$_4$, 1.08 gms. per min. and CCl$_4$, 0.63 gms. per min. The carrier gas was CO at the rate of 5.78 gms. per min.

The analysis of the residue following the differential iron chlorination stage was 0.049% Fe$_2$O$_3$. The Fe$_2$O$_3$ differentially chlorinated was approximately 97.5%.

EXAMPLE 5

In this example a prolonged period of 60 minutes was used to study the affect in the differential iron chlorination stage below about 680° C. wherein it was thought that non-volatile ferrous chloride could be formed and would require a second differential iron chlorination stage at a higher temperature to volatilize possible formation of ferrous chloride, FeCl$_2$. The differential iron chlorination agent used was AlCl$_3$ and the carrier gas was CO.

The head analysis of the calcined product was 1.53% Fe$_2$O$_3$ and the residue following the differential iron chlorination stage was 0.219% Fe$_2$O$_3$. The Fe$_2$O$_3$ differentially chlorinated and removed from the product was 85.6%, appreciably poorer than with temperatures above 680° C.

The invention has been described herein with reference to certain preferred embodiments. However, as obvious variations thereon will become apparent to those skilled in the art, the invention is not considered limited thereto.

What is claimed is:

1. A process for the production of substantially iron free alumina-silica product from material selected from the group consisting of Kaolinitic clays and bauxites, wherein said material contains iron values, said process comprising:
    (a) mixing said materials to contain in a subsequent prepared material 20% to about 60% kaolinite and 40% to about 80% Al$_2$O$_3$×H$_2$O on a dry basis;
    (b) wet beneficiating the resultant mixture to produce prepared material for a subsequent agglomeration stage and subsequent calcining stage and subsequent differential iron chlorination stage wherein agglomerates of the said prepared material following the said subsequent calcining stage are in the U.S. standard sieve size range of minus 6 mesh to about plus 200 mesh and have a tap density of about 0.8 to 1.3;
    (c) subsequently subjecting the said prepared material to said agglomeration stage to produce agglomerates of the said prepared material in the said U.S. standard sieve range of minus 6 mesh to about plus 200 mesh and which in the subsequent calcining stage produce calcined agglomerates having the said top density of about 0.8 to 1.3;
    (d) subsequently subjecting the said agglomerates of the said prepared material to the said calcining stage wherein the said agglomerates are heated to within the temperature range of about 650° C. to about 900° C. to remove free moisture and water of crystallization contained in the said agglomerates and to convert the said kaolinite to amorphous silica and amorphous alumina, and the said Al$_2$O$_3$×H$_2$O mineral to Al$_2$O$_3$, to produce the said calcined agglomerates in the said particle size range of about minus 6 mesh to about plus 200 mesh and having the said tap density of about 0.8 to 1.3 and containing a minimum of about 10% of said amorphous silica; and
    (e) subsequently subjecting the said calcined agglomerates to at least one differential iron chlorination stage wherein in the said at least one differential iron chlorination stage there is present at least one chlorination agent selected from the group consisting of $Cl_2$, $COCl_4$, $CCl_4$, HCl, $AlCl_3$ and $SiCl_4$ and wherein the temperature range is from 550° C. to about 1100° C. to produce an alumina-silica product substantially iron free.

2. A process for the production of substantially iron free aluminum chloride from material selected from the group consisting of kaolinitic clays and bauxites, wherein said material contains iron values, said process comprising:

(a) mixing said materials to contain in a subsequent prepared material 20% to about 60% kaolinite and 40% to about 80% $Al_2O_3 \times H_2O$ on a dry basis;

(b) wet beneficiating the resultant mixture to produce prepared material for a subsequent agglomeration stage and subsequent calcining stage and subsequent differential iron chlorination stage wherein agglomerates of the said prepared material following the said subsequent calcining stage are in the U.S. standard sieve size range of minus 6 mesh to about plus 200 mesh and have a tap density of about 0.8 to 1.3;

(c) subsequently subjecting the said prepared material to said agglomeration stage to produce agglomerates of the said prepared material in the said U.S. standard sieve range of minus 6 mesh to about plus 200 mesh and which in the subsequent calcining stage produce calcined agglomerates having the said tap density of about 0.8 to 1.3;

(d) subsequently subjecting the said agglomerates of the said prepared material to the said calcining stage wherein the said agglomerates are heated to within the temperature range of about 650° to about 900° C. to remove free moisture and water of crystallization contained in the said agglomerates and to convert the said kaolinite to amorphous silica and amorphous alumina, and the said $Al_2O_3 \times H_2O$ mineral to $Al_2O_3$, to produce the said calcined agglomerates in the said particle size range of about minus 6 mesh to about plus 200 mesh and having the said tap density of about 0.8 to 1.3 and containing a minimum of about 10% of said amorphous silica;

(e) subsequently subjecting the said calcined agglomerates to at least one differential iron chlorination stage wherein in the said at least one differential iron chlorination stage there is present at least one chlorination agent selected from the group consisting of $Cl_2$, $COCl_4$, $CCl_4$, HCl, $AlCl_3$ and $SiCl_4$ and wherein the temperature range is from 550° C. to about 1100° C. to produce an alumina-silica product substantially iron free;

(f) subjecting the said substantially iron free alumina-silica product to a mass chlorination stage wherein at least one chlorination agent is selected from the group consisting of $Cl_2$, $COCl_2$ and $CCl_4$ and the chlorination stage is carried out in the temperature range of about 550° C. to about 1100° C. to produce a gas stream containing at least aluminum chloride and silicon tetrachloride; and (g) subsequently subjecting the said gas stream to at least controlled temperature condensation to produce said aluminum chloride substantially iron free.

3. The process of claim 1 or 2 wherein the said agglomerates of the said prepared material are heated prior to the said calcining stage.

4. The process of claim 1 or 2 wherein the said at least one differential iron chlorination stage is carried out in the temperature range of about 680° C. to about 1000° C.

5. The process of claim 1 or 2 wherein in the said differential iron chlorination stage calcium chloride is present.

6. The process of claim 1 or 2 wherein the said calcined agglomerates have a tap density of about 0.8 to 1.2.

* * * * *